United States Patent [19]

Burch

[11] Patent Number: 5,544,839

[45] Date of Patent: Aug. 13, 1996

[54] SPOOL HOLDER FOR TRANSFERRING LINE

[76] Inventor: Brad J. Burch, 12311 Advance, Houston, Tex. 77065

[21] Appl. No.: 250,363

[22] Filed: May 27, 1994

[51] Int. Cl.⁶ .................................................. B65H 59/00
[52] U.S. Cl. .................. 242/396.6; 242/404; 242/422.4; 242/423; 242/599.2; 242/599.4; 242/902
[58] Field of Search ................................ 242/902, 422.4, 242/423, 404, 406, 599.2, 599.4, 396.6, 156, 129.8

[56] References Cited

U.S. PATENT DOCUMENTS

| | | | |
|---|---|---|---|
| 1,469,284 | 10/1923 | Strawn | 242/423 X |
| 1,704,614 | 3/1929 | Johnston | 242/599.4 X |
| 2,600,601 | 6/1952 | Yirava | 242/156 |
| 2,699,903 | 1/1955 | Montgomery | 242/599.4 X |
| 3,145,940 | 8/1964 | Henry | 242/599.2 |
| 3,685,761 | 8/1972 | Zelinski | 242/129.8 X |
| 4,151,966 | 5/1979 | Lindsay | 242/902 X |
| 4,540,136 | 9/1985 | Rauch | 242/902 X |
| 4,564,411 | 1/1986 | Holzer | 242/423 X |
| 4,795,107 | 1/1989 | Williams | 242/902 X |
| 5,029,409 | 7/1991 | Nouwens | 242/129.8 X |
| 5,209,423 | 5/1993 | Barginear | 242/406 X |
| 5,375,788 | 12/1994 | English | 242/129.8 |

Primary Examiner—Daniel P. Stodola
Assistant Examiner—William A. Rivera
Attorney, Agent, or Firm—Kenneth A. Roddy

[57] ABSTRACT

A spool holder for holding a spool and transferring a quantity of line under tension between the spool and a reel. The holder is a generally U-shaped member having a horizontal bottom wall and vertical side walls fixed in laterally spaced relation and each side wall has a circular aperture therethrough in horizontal axial alignment. Suction cups on the underside of the bottom wall releasably secure the holder to a support surface. A shaft is received through the bore of the spool and is frictionally engaged therein and has opposed ends rotatably mounted in the side wall apertures to rotate relative thereto such that the spool and shaft rotate as a single unit. Resilient members may be installed on the shaft for adapting the shaft to frictionally engage different size bores. One embodiment has an adjustable thumb screw which frictionally engages the shaft to apply resistance during rotation to maintain tension in the line when being unwound from the spool and transferred onto the reel and also has a hand crank connected to the shaft for rotating the spool to wind line back onto a spool from a reel. Another embodiment has a pair of adjustable thumb screws extending through the side walls in horizontally opposed relation with their inward facing ends movable into frictional engagement with the laterally opposed flanges of the spool to apply frictional resistance to the spool during rotation.

2 Claims, 4 Drawing Sheets

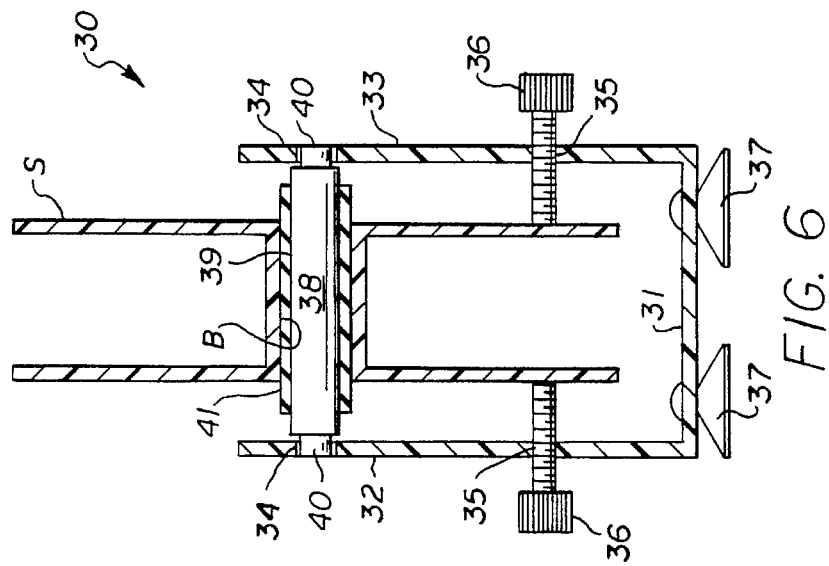
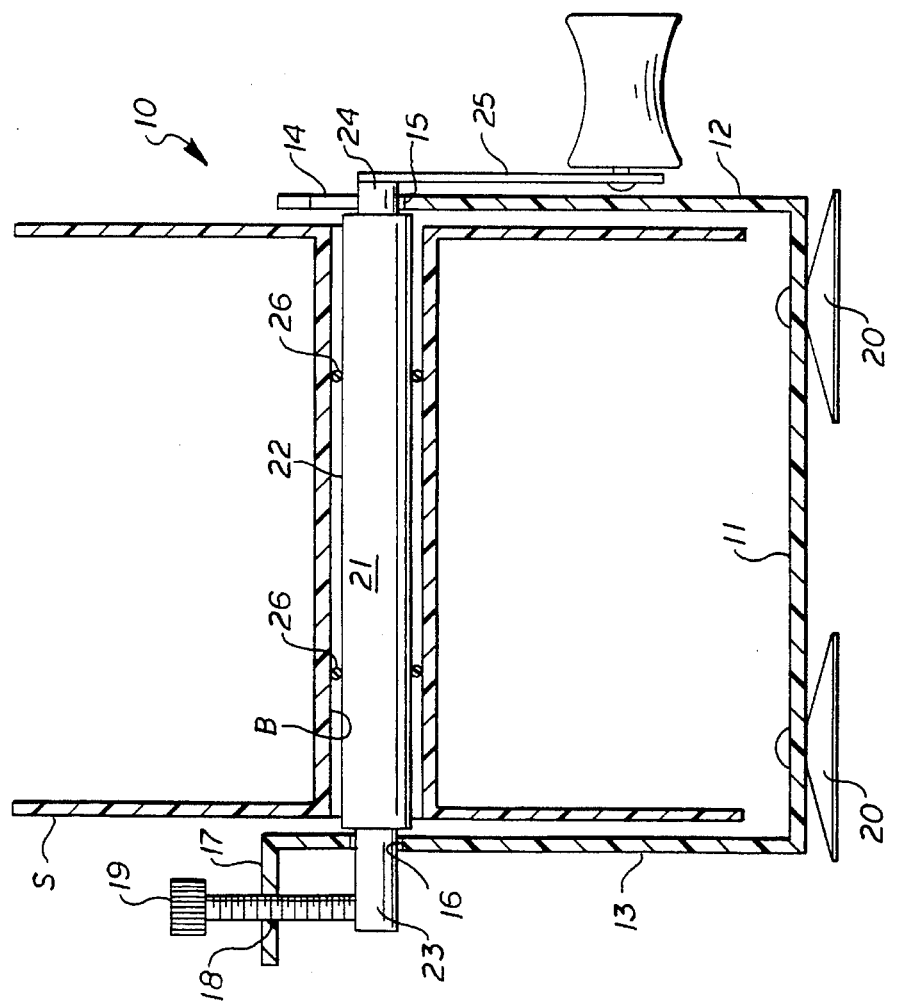

5,544,839

SPOOL HOLDER FOR TRANSFERRING LINE

BACKGROUND OF THE INVENTION

1. Field of the Invention

This invention relates generally to fishing line spool holders, and more particularly to a fishing line spool holder that rotatably supports a fishing line spool for transferring a quantity of line between the spool and a reel and has adjustable means for controlling rotation to place tension in the line being unwound and may also be used to wind line from the reel onto a spool.

2. Brief Description of the Prior Art

It is desirable to wind fishing line onto a fishing reel with a constant tension force on the unwound portion so that the wound line will not be twisted and will not have portions that are loose and portions that are tight, which may cause a backlash when casting the line. Usually the person winding the line onto the reel will hold the reel in one hand and apply a slight pinching force to the line with the fingers of that hand as it is being fed onto the reel to keep tension in the line as he turns the hand crank with the other hand. However, the spool from which the line is being unwound must be rotatably supported in some manner.

It is a common practice when placing fishing line on a fishing reel to have one person suspend a spool of new fishing line on a horizontally held pencil or similar rod-like article while another person winds the line onto the fishing reel by turning the hand crank of the reel. The spool rotates loosely on the pencil or rod-like article and there is no way for the person holding the spool to control the speed of its rotation except by attempting to apply pressure on the side flanges of the spool with the fingers which is cumbersome and awkward. As a result, spool will sometimes be dropped or the spool will rotate freely causing the line being wound to become tangled, or at best, the wound line will have the undesirable loose and tight portions.

There are several patents which disclose various devices for holding a spool of fishing line, most of which support the spool on a non-rotating bolt having a wingnut at one end. The small diameter bolt is unsuitable for use with most commercially available fishing line spools which may have a bore as large as ⅝" in diameter. This loose fit allows the spool to hop or wobble as the line is being spooled off.

Barginear, U.S. Pat. No. 5,209,423 discloses a fishing line spool holder which is a U-shaped bracket having laterally opposed end plates formed of flexible material. The spool is rotatably mounted on a non-rotating shaft which extends between the flexible end plates and outwardly to each side. The non-rotating shaft is a small diameter bolt with a wing nut threadedly received on the opposed end. Spool rotation is controlled by turning the wing nut to draw the flexible end plates toward each other and frictionally engage the side flanges of the spool. However, this arrangement is difficult to adjust because the large surface area of both end plates contact substantially the entire surface of both side flanges of the spool and provide either too much friction or not enough friction. Also, because the end plates are fixed relative to each other, this device will only accept a very limited range of spool widths, whereas, commercially available spools of fishing line range from about 1" to about 4" in width. This device would be unsuitable for use with most commercially available fishing line spools which may have a bore as large as ⅝" in diameter because the loose fit would allow the spool to hop or wobble as the line is being spooled off.

Lewitt, U.S. Pat. No. 4,948,059 discloses a tensioning device for a fishing line which has an L-shaped base member and a smaller L-shaped traveling member which has its horizontal leg is slidably mounted in a slot on the horizontal leg of the base member to slide relative thereto. The spool is rotatably mounted on a non-rotating shaft which extends between the upstanding arms of the L-shaped members and outwardly to each side. The non-rotating shaft is a bolt with wing nuts threadedly received on opposite ends. Spool rotation is controlled by turning the wing nut to draw the upstanding arm of the traveling member toward the upstanding arm of the base member and frictionally engage the side flanges of the spool. However, this arrangement is also difficult to adjust because the large surface area of both upstanding arms contact substantially the entire surface of both side flanges of the spool and provide either too much friction or not enough friction. Alternatively, Lewitt discloses a rack and pinion mechanism and a spring mechanism for drawing the upstanding arm of the traveling member toward the upstanding arm of the base member. This device would also be unsuitable for use with most commercially available fishing line spools which may have a bore as large as ⅝" in diameter because the loose fit would allow the spool to hop or wobble as the line is being spooled off.

Haddock, U.S. Pat. No. 3,587,995 discloses an apparatus for applying fishing line to a spin casting reel which has a frame that carries a spindle which receives the spool of fishing line. The frame is releasably coupled by legs to the pickup cylinder of the fishing reel. A rubber or plastic grommet or keeper may be slipped over the spindle to retain the spool to keep it from dropping or sliding off the spindle, or to adjust line tension by applying pressure against the spool.

Hollack, U.S. Pat. No. 3,520,491 discloses a spool supporting device which has a horizontal circular base member with a tapered circumference. A suction cup is secured to the bottom of the base and a vertical threaded shaft extends upwardly from the center of the base. The spool is rotatably mounted on the shaft and a wing nut having a conical bottom portion is threadedly received on the shaft and frictionally engaged in the bore of the spool. A plurality of slotted fingers extend upwardly and inwardly from the tapered circumference of the base to engage the upper rim of the spool. The line is unwound axially from the spool (in the direction of the shaft) by tightening the wing nut to prevent spool rotation and pulling the line between the upper rim of the spool and the top ends of the fingers, or may be unwound in a tangential direction by loosening the wing nut to allow spool rotation and pulling the line through one of the slots in one of the fingers wherein spool rotation is controlled by turning the wing nut to engage the spool bore and adjusting the fingers to bear against the upper rim of the spool.

The outer surfaces of the flanges of commercially available spools of fishing line are not always perfectly flat, and the prior art devices which frictionally engage the flange of the spool have an inherent problem in that the spool is subject to alternate binding and free rotation as the line is unwound which causes uneven tension in the line. The devices which support the spool on a small diameter bolt are unsuitable for use with most commercially available fishing line spools which may have a bore as large as ⅝" in diameter. This loose fit allows the spool to hop or wobble as the line is being spooled off.

The present invention is distinguished over the prior art in general, and these patents in particular by a spool holder for holding a spool and transferring a quantity of line under tension between the spool and a reel. The holder is a generally U-shaped member having a horizontal bottom wall and vertical side walls fixed in laterally spaced relation and each side wall has a circular aperture therethrough in horizontal axial alignment. Suction cups on the underside of the bottom wall releasably secure the holder to a support surface. A shaft is received through the bore of the spool and is frictionally engaged therein and has opposed ends rotatably mounted in the side wall apertures to rotate relative thereto such that the spool and shaft rotate as a single unit. Resilient members may be installed on the shaft for adapting the shaft to frictionally engage different size bores. One embodiment has an adjustable thumb screw which frictionally engages the shaft to apply resistance during rotation to maintain tension in the line when being unwound from the spool and transferred onto the reel and also has a hand crank connected to the shaft for rotating the spool to wind line back onto a spool from a reel. Another embodiment has a pair of adjustable thumb screws extending through the side walls in horizontally opposed relation with their inward facing ends movable into frictional engagement with the laterally opposed flanges of the spool to apply frictional resistance to the spool during rotation.

SUMMARY OF THE INVENTION

It is therefore an object of the present invention to provide a spool holder for holding a spool and transferring a quantity of line under tension between the spool and a reel so that the wound line will not be twisted or have portions that are loose and portions that are tight.

It is another object of this invention to provide a spool holder for holding a spool which can be used for both transferring a quantity from a spool onto a reel and transferring line off of a reel onto a spool.

Another object of this invention is to provide a spool holder having a shaft for holding a spool wherein the spool and shaft rotate as a single unit.

Another object of this invention is to provide a spool holder having a shaft for holding a spool wherein the shaft is easily and quickly adapted to be received and frictionally engage different size spool bores to eliminate hopping or wobble of the spool as line is being wound on or off the spool.

Another object of this invention is to provide a spool holder for holding a spool and transferring a quantity of line which has an adjustable thumb screw which frictionally engages the shaft to apply resistance during rotation to maintain tension in the line when being unwound from the spool and allows very precise adjustment to control the amount of friction.

Another object of this invention is to provide a spool holder for holding a spool and transferring a quantity of line which has a pair of adjustable thumb screws which frictionally engage the laterally opposed flanges of the spool to apply frictional resistance to the spool during rotation.

Another object of this invention is to provide a spool holder for holding a spool and transferring a quantity of line under tension between the spool and a reel which will accept a very large range of spool sizes from about 1" to 5" in diameter and from about 1" to 4" in width.

A further object of this invention is to provide a spool holder which is releasably mounted on any flat surface regardless of the angle of the surface and is supported thereon at four corners to prevent unwanted movement of the holder as line is being wound on or off the spool.

A still further object of this invention is to provide a spool holder which is simple in construction, economical to manufacture, and reliable in use.

Other objects of the invention will become apparent from time to time throughout the specification and claims as hereinafter related.

The above noted objects and other objects of the invention are accomplished by the present spool holder for holding a spool and transferring a quantity of line under tension between the spool and a reel. The holder is a generally U-shaped member having a horizontal bottom wall and vertical side walls fixed in laterally spaced relation and each side wall has a circular aperture therethrough in horizontal axial alignment. Suction cups on the underside of the bottom wall releasably secure the holder to a support surface. A shaft is received through the bore of the spool and is frictionally engaged therein and has opposed ends rotatably mounted in the side wall apertures to rotate relative thereto such that the spool and shaft rotate as a single unit. Resilient members may be installed on the shaft for adapting the shaft to frictionally engage different size bores. One embodiment has an adjustable thumb screw which frictionally engages the shaft to apply resistance during rotation to maintain tension in the line when being unwound from the spool and transferred onto the reel and also has a hand crank connected to the shaft for rotating the spool to wind line back onto a spool from a reel. Another embodiment has a pair of adjustable thumb screws extending through the side walls in horizontally opposed relation with their inward facing ends movable into frictional engagement with the laterally opposed flanges of the spool to apply frictional resistance to the spool during rotation.

BRIEF DESCRIPTION OF THE DRAWINGS

FIG. 3 is a transverse cross section through the spool holder of FIG. 1.

FIG. 6 is a transverse cross section through the spool holder of FIG. 4.

DESCRIPTION OF THE PREFERRED EMBODIMENT

Figure 1:
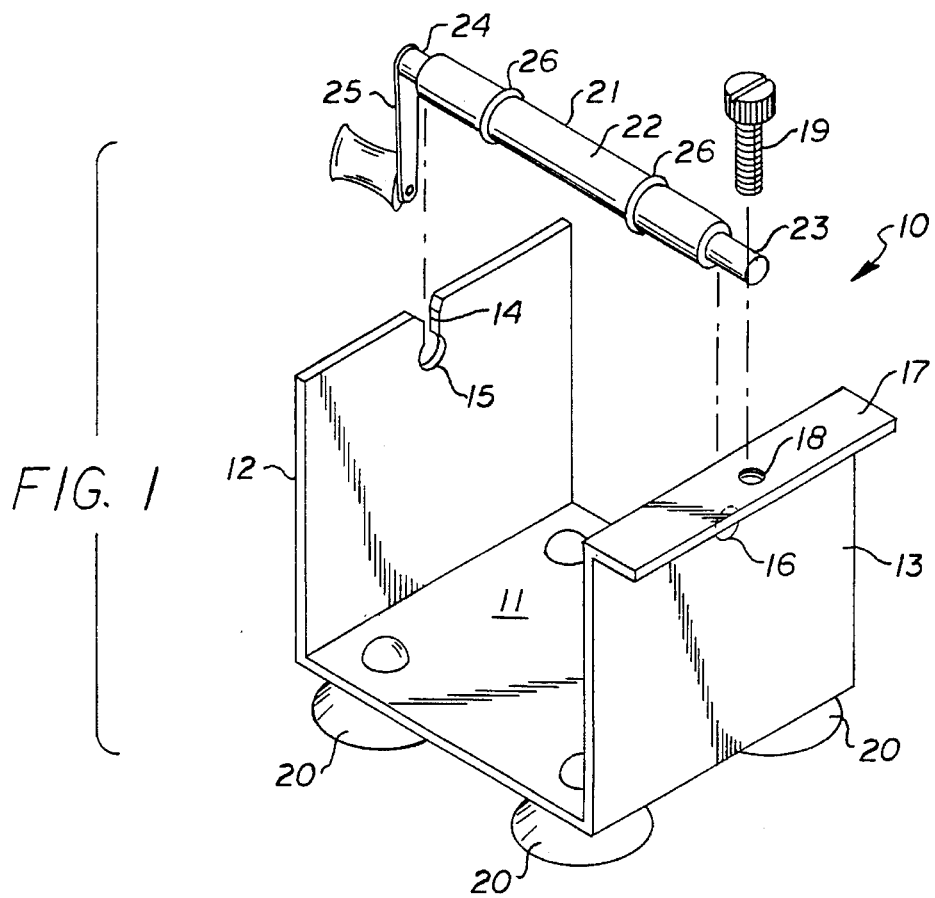
FIG. 1 is an exploded isometric view of a preferred embodiment of a spool holder in accordance with the present invention shown from the top and one side.
Figure 2:
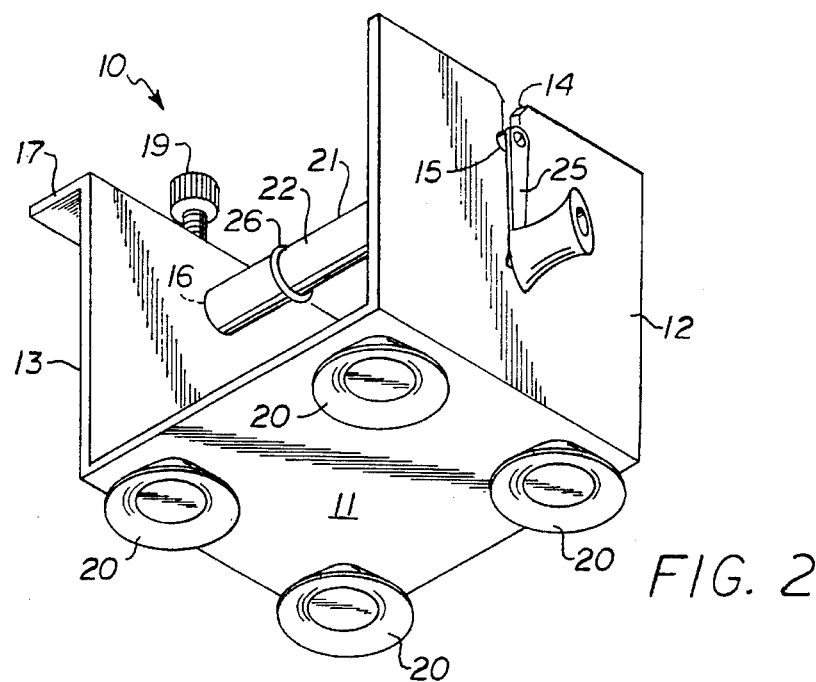
FIG. 2 is an exploded rear elevation of the spool holder of FIG. 1 shown from the bottom and opposite side.

Referring to the drawings by numerals of reference, there is shown in FIGS. 1, 2, and 3, a preferred embodiment of a spool holder 10. In the embodiment of FIGS. 1–3, the spool holder is used for holding a spool of type having a central barrel portion with radial flanges at each end and a central bore through the barrel and on which a quantity of line, such as fishing line, is wound. The embodiment of FIGS. 1–3 may be used for transferring line off the spool onto another object, such as a fishing reel, or for winding line onto an empty spool from the other object.

The spool holder 10 is a generally U-shaped member having a horizontal bottom wall 11 and laterally spaced vertical side walls 12 and 13. One side wall 12 has a vertical slot 14 extending downwardly a short distance from the top edge which terminates in a circular aperture 15. The opposed side wall 13 has a circular aperture 16 in horizontal axial alignment with the circular aperture 15.

The side wall 13 has a horizontal portion 17 extending outwardly perpendicular thereto. A threaded bore 18 extends vertically through the horizontal portion 17 with its axis perpendicular to the horizontal axis of the apertures 15 and 16. A thumb screw 19 is threadedly received in the threaded bore 18.

Suction cups 20 are secured to the bottom wall 11 near each corner for releasably securing the spool holder 10 to a convenient flat surface, regardless of the angle of inclination, such as a table top, surface of a boat or windshield.

A shaft 21 is installed between the side walls 12 and 13. The shaft 21 has a central portion 22 which terminates at each end in reduced diameter portions 23 and 24. The reduced diameter portions 23 and 24 are slightly smaller than the apertures 15 and 16 to rotate freely therein. The width of the vertical slot 14 is slightly smaller than the reduced diameter portion 24.

A hand crank 25 is secured to the outer end of the reduced diameter portion 24 by conventional means such as a screw. Because not all commercial spools of fishing line have the same diameter bore through the barrel of the spool, a pair of resilient 0-rings 26 are provided which are placed onto the central portion 22 of the shaft 21 in longitudinally spaced relation to frictionally engage the bore B of the spool S and compensate for different diameter bores (FIG. 3). Thus, the spool S and shaft 21 rotate as a single unit relative to the side walls 23 and 24.

To install a spool S in the holder 10, the shaft 21 is inserted through the bore B of the barrel of the spool to frictionally engage the bore. If there is no frictional engagement, the resilient O-rings 26 are placed onto the central portion 22 of the shaft 21 in longitudinally spaced relation to frictionally engage the bore when the shaft 21 is inserted through the bore of the barrel of the spool.

The shaft 21 with the spool S mounted thereon is installed by placing one reduced diameter portion 23 through the aperture 16 and the other reduced diameter portion 24 at the top of the slot 14 and then pressing it downward until it snaps into the aperture 15. The spool S and shaft 21 are then rotatably supported in the apertures 15 and 16. In the installed position, the reduced diameter portions 23 and 24 extend outwardly beyond the side walls 12 and 13.

As best seen in FIG. 3, to prevent free rotation and to apply tension in the line as it is being unwound from the spool, the thumb screw 19 is rotated such that the bottom of its shaft frictionally engages the outwardly extended end of the reduced diameter portion 23 of the shaft. Because the bottom end of the thumb screw shaft engages the round surface of the reduced diameter portion 23 tangentially, there is not a large surface area in frictional contact, and this feature allows very precise adjustment to control the amount of friction and, thus, the rotation of the spool.

It has been found that the outer surfaces of the flanges of commercially available spools are not always perfectly flat, and the feature of frictionally engaging the shaft 21, rather than the spool flange, overcomes the problem of alternately binding and free rotation as the line is unwound which occurs with devices which attempt to frictionally engage the spool to control rotation.

It should be noted that because spool rotation is controlled by frictional engagement of the thumb screw 19 on the shaft 21, rather than frictionally engaging the spool, that the embodiment of FIGS. 1–3 will accept a very large range of spool sizes from about 1" to 5" in diameter and from about 1" to 4" in width.

It should also be noted that the device is capable of frictionally engaging various diameter bores which makes it suitable for nearly all commercially available fishing line spools and prevents the spool from hopping or wobbling as the line is being spooled on or off the spool.

Figure 4:
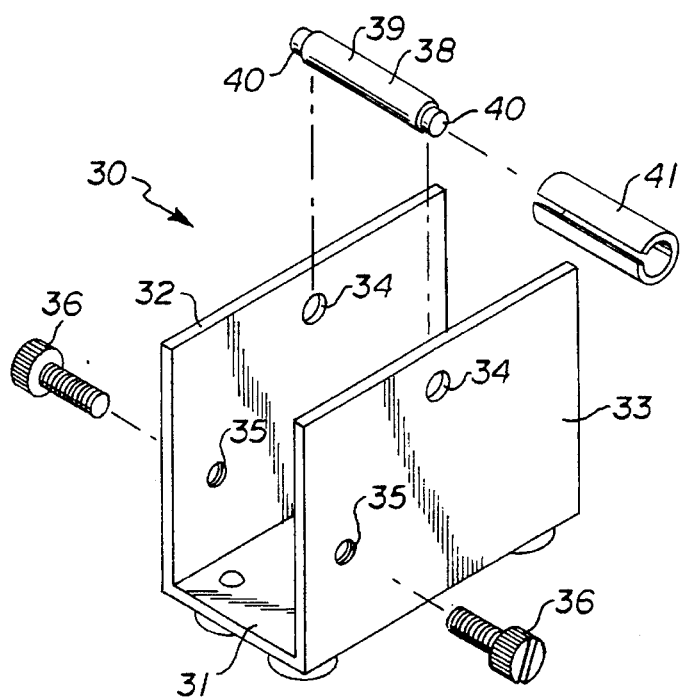
FIG. 4 is an exploded isometric view of a second preferred embodiment of the spool holder in accordance with the present invention shown from the top and one side.
Figure 5:
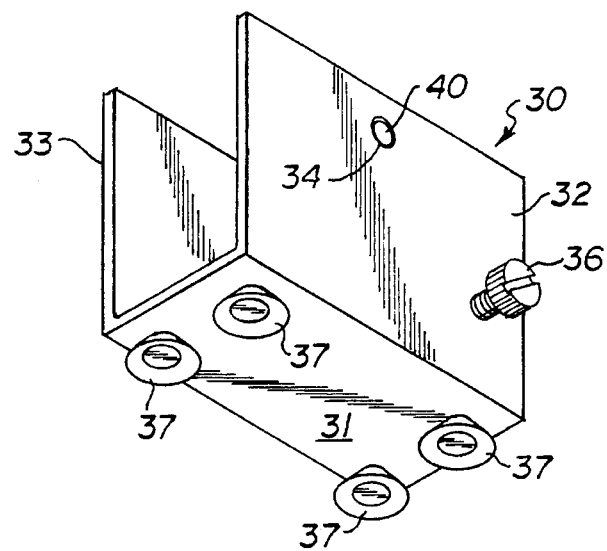
FIG. 5 is an exploded rear elevation of the spool holder of FIG. 4 shown from the bottom and opposite side.

Referring now to FIGS. 4, 5, and 6, there is shown another embodiment of the spool holder 30. In the embodiment of FIGS. 4–6, the spool holder does not have a hand crank and is used only for transferring line off the spool onto another object, such as a fishing reel.

The spool holder 30 is a generally U-shaped member having a horizontal bottom wall 31 and laterally spaced vertical side walls 32 and 33. Each side wall 32 and 33 has a circular aperture 34 in horizontal axial alignment.

Each side wall 32 and 33 has a threaded bore 35 extending therethrough in horizontal axial alignment, each of which is spaced radially outward from the apertures 34 in the side walls 32 and 33. A thumb screw 36 is threadedly received in each threaded bore 35.

Suction cups 37 are secured to the bottom wall 31 near each corner for releasably securing the spool holder 30 to a flat surface, regardless of the angle of inclination, such as a table top, surface of a boat or windshield.

A shaft 38 is installed between the side walls 32 and 33. The shaft 38 has a central portion 39 which terminates at each end in reduced diameter portions 40. The reduced diameter portions 40 are slightly smaller than the apertures 34 to rotate freely therein.

Because not all commercial spools of fishing line have the same diameter bore through the barrel of the spool, a split sleeve 41 formed of resilient material is provided which is placed onto the central portion 39 of the shaft 38 to frictionally engage the bore of the spool and compensate for different diameter bores.

As best seen in FIG. 6, to install a spool S in the holder 30, the shaft 38 is inserted through the bore B of the barrel of the spool to frictionally engage the bore. If there is no frictional engagement, the resilient split sleeve 41 is placed onto the central portion 39 of the shaft 38 to frictionally engage the bore B when the shaft is inserted through the bore of the barrel of the spool.

The shaft 38 with the spool mounted thereon is installed by flexing the side walls 32 and 33 slightly apart and pushing the shaft 38 downward until the reduced diameter portions 40 are received in the apertures 34, and then releasing the side walls. Once in position, the reduced diameter portions 40 extend into the apertures 34 and the shaft 38 is rotatably supported in the apertures 15 and 16. Thus, the spool S and shaft 38 rotate as a single unit relative to the side walls.

OPERATION

Figure 7:
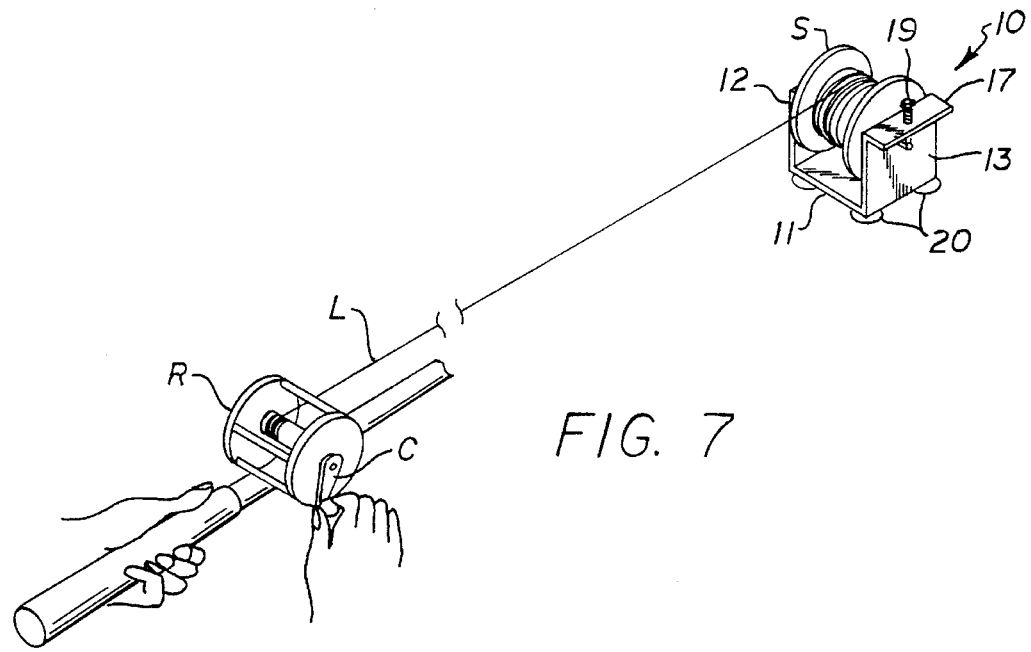
FIG. 7 is a perspective view of the spool holder of FIG. 1, showing the fishing line under tension being transferred to a fishing reel.

FIG. 7 illustrates the spool holder 10 of FIG. 1 being utilized to transfer fishing lie L under tension onto a fishing reel R. The holder 10 with the spool S installed, as described above, is secured to a flat surface and the free end of the line L is fastened to the midsection of the reel R. The thumb screw 19 is adjusted to engage the surface of the outwardly extended reduced diameter portion 23 of the shaft to apply the desired amount of friction to allow rotation of the spool S but prevent free rotation. The hand crank C of the fishing reel R is turned by the operator to wind the line L onto the reel. After a few turns, the thumb screw 19 may be adjusted such that the fishing line L is wound onto the reel R with a constant tension force on the line. The line which has been wound onto the reel will not have portions that are loose and portions that are tight, which may otherwise cause a backlash when casting.

It is often desirable to change the line which is already on a fishing reel, in which case the line on the reel may be saved onto an empty spool for future use, or "recycled".

Figure 8:
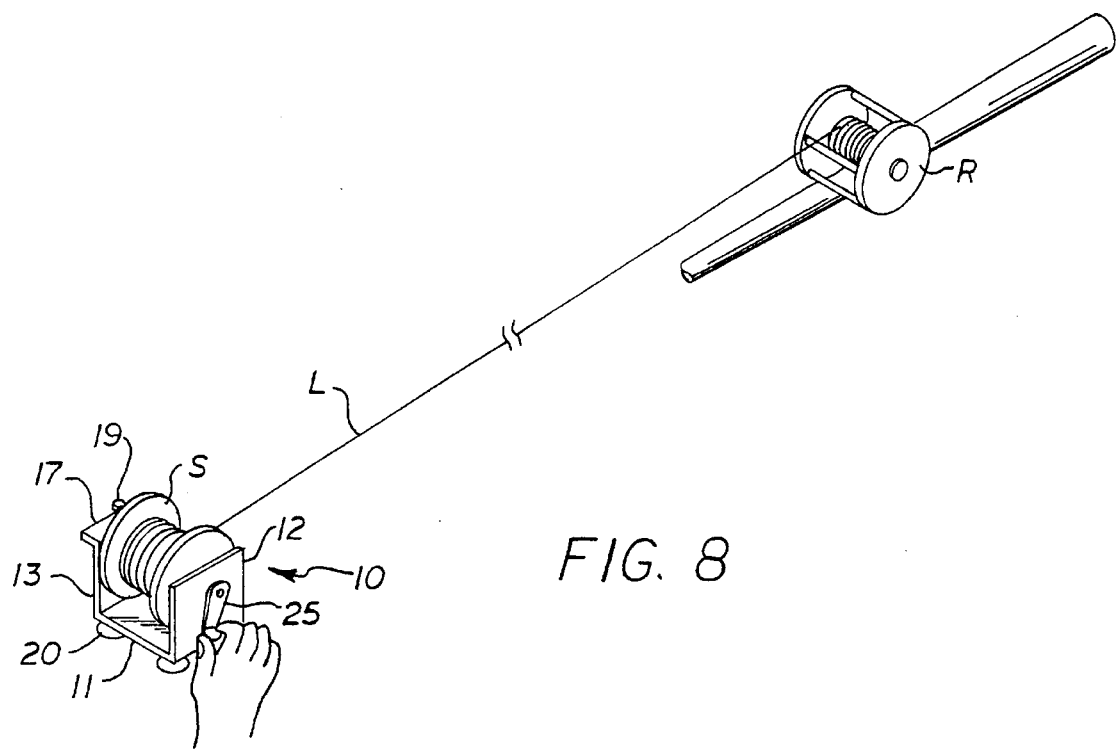
FIG. 8 is a perspective view of the spool holder of FIG. 1, showing the fishing line being transferred from a fishing reel back onto a spool.

FIG. 8 illustrates the spool holder 10 of FIG. 1 being utilized to transfer fishing line L from the reel R back onto a spool S. The holder 10 with an empty spool S installed therein is secured to a flat surface and the free end of the line L is fastened to the midsection of the spool S. The thumb screw 19 is loosened to allow free rotation of the spool. The hand crank 25 at the outer end of the reduced diameter portion of the shaft is turned by the operator to wind the line L onto the spool S. If the reel has a drag mechanism, the drag may be set such that the fishing line is wound onto the spool with a constant tension force on the line. The unused line may then be conveniently stored in a tackle box or other convenient location and when desired for use, may be wound back onto the reel as described above.

Although the present invention has been described as being used for transferring fishing line, it should be understood that it may also be used for transferring any other type of line, thread, cord, rope, etc. between the spool and a reel.

The suction cups 20 allow the spool holder to be easily and quickly installed on any convenient surface at any angle, such as on a surface of a boat or on a windshield, or it can be installed upside down. The device is supported at four corners to prevent unwanted movement of the holder as line is being wound on or off the spool. Alternatively, the spool holder 10 can be held in the hand using the horizontal surface 17 as a handle.

While this invention has been described fully and completely with special emphasis upon a preferred embodiment, it should be understood that within the scope of the appended claims the invention may be practiced otherwise than as specifically described herein.

I claim:

1. A spool holder for holding a spool having a central bore to transfer a quantity of line between the spool and a reel comprising:

a generally U-shaped member having a horizontal bottom wall with an underside, first and second vertical side walls fixed in laterally spaced relation, a horizontal portion at an upper end of said first vertical side wall extending perpendicular thereto;

suction cup mounting means on the underside of said horizontal bottom wall for releasably securing said U-shaped member to a support surface;

a first circular aperture extending through said first vertical wall a distance downwardly from said upper end, a second circular aperture extending through said second vertical side wall a distance downwardly from an upper end thereof in horizontal axial alignment with said first circular aperture, an open ended vertical slot extending downwardly from said second vertical side wall upper end and terminating in said second circular aperture, and a threaded bore extending vertically through said horizontal portion with its axis perpendicular to the horizontal axis of said circular apertures;

a shaft having a central portion adapted to be received through said spool central bore and frictionally engaged therein to prevent relative rotation between said shaft and said central bore and having first and second reduced diameter outer ends;

said first reduced diameter end extending rotatably through said first circular aperture and axially outward from said first vertical side wall to rotate relative thereto and said second reduced diameter end being pressed downwardly through said slot and received in said second circular aperture to extend rotatably therethrough and axially outward from said second vertical side wall to rotate relative thereto such that said spool and said shaft rotate as a single unit relative to said vertical side walls;

a hand crank operatively connected to said second reduced diameter end of said shaft to rotate said spool and said shaft as a single unit; and an adjustable thumb screw having a threaded shaft threadedly engaged in said threaded bore to extend vertically through said horizontal portion of said first side wall and a bottom end selectively movable into engagement with said first reduced diameter end of said shaft to apply an adjustable amount of frictional resistance to said shaft during rotation to maintain tension in said line when being unwound from said spool and transferred onto the reel, and being movable out of engagement with said first reduced diameter end to allow free rotation of said shaft and said spool when said line is being unwound from the reel and transferred onto said spool.

2. The spool holder according to claim 1 including at least one annular resilient member removably received on said shaft central portion to frictionally engage said shaft in different size central bores of spools and prevent relative rotation between said shaft and said central bore.

* * * * *